T. E. MURRAY, Jr.
APPARATUS FOR ELECTRICALLY WELDING PLATES.
APPLICATION FILED OCT. 8, 1919.

1,370,987.  Patented Mar. 8, 1921.

Inventor
Thomas E. Murray Jr.
By
Attorney

UNITED STATES PATENT OFFICE.

THOMAS E. MURRAY, JR., OF BROOKLYN, NEW YORK.

APPARATUS FOR ELECTRICALLY WELDING PLATES.

1,370,987.  Specification of Letters Patent.  Patented Mar. 8, 1921.

Application filed October 8, 1919. Serial No. 329,341.

*To all whom it may concern:*

Be it known that I, THOMAS E. MURRAY, Jr., a citizen of the United States, residing at Brooklyn, in the county of Kings and State of New York, have invented a certain new and useful Improvement in Apparatus for Electrically Welding Plates, of which the following is a specification.

The invention relates to the electrical welding of metal plates of large area, such as are used for ship-building, and consists in the apparatus as more particularly hereinafter set forth.

In the accompanying drawing—

Figure 1:
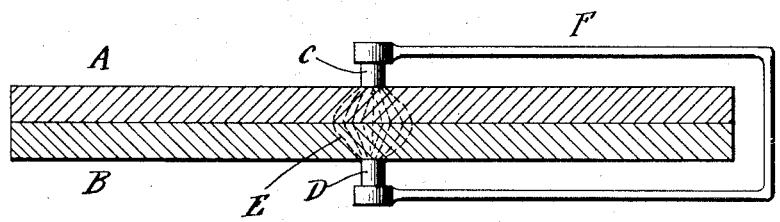
Figure 2:
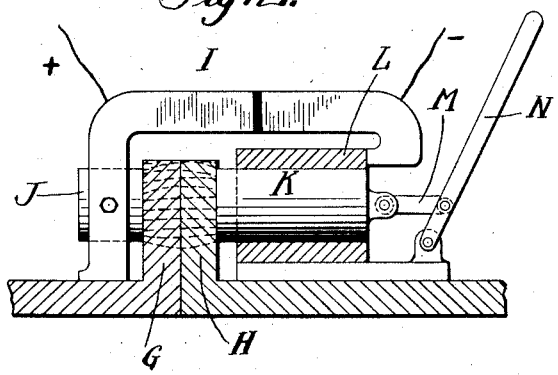

Figure 1 is an illustrative diagram, showing two superposed metal plates in section. Fig. 2 is a section of the flanged plates to be united together with a welding apparatus adapted to carry my method into practical effect.

Similar letters of reference indicate like parts.

In electrically welding two plates A, B of large area and superposed—as shown, for example, in Fig. 1—at points distant from the edges, the path of the current does not have a cross sectional area corresponding to that of a face, or faces, of the electrodes C, D, but, on the contrary, the lines of force, as is well known, bulge outwardly, as indicated at E, with the result that a considerable fraction of the current beyond that necessary to unite the plates is wasted simply in heating them. If, in addition, the welded spots are to be made at a considerable distance from an edge of the plate (by portable welding apparatus) it is necessary that the supporting means for the electrodes C, D have a yoke (indicated at F) long enough to extend over said edge. This yoke must be strongly constructed in order to give it the necessary stiffness and rigidity, and it is accordingly heavy and difficult to handle.

Another disadvantage with the present method of welding metal plates of large area is the electrical field set up by the plates themselves which opposes the flow of current. Due to the position of the plates as shown in Fig. 1, a counter-electro-motive force is set up, which in some cases is large enough to prevent almost any flow of current across the electrodes C, D in Fig. 1.

I obviate the foregoing difficulties in the following manner: Upon the edges to be joined I form flanges G, H, the outer faces of which I bring together, Fig. 2. The welding apparatus need then have a yoke I no larger than is required to support the electrodes J, K and span the approximated flanges. The electrode K is here shown as movable in the cylinder L and operated by the link M and hand lever N to bring it into contact with the flange H. The opposite electrode J is fixed on the yoke. The lines of force between the electrodes J, K are now almost entirely within the areas of the electrode faces, as shown by the dotted lines in Fig. 2. Practically no lines of force can pass through the air outside of the flanges, and very few go through the body portions of the plates. The result is that I facilitate the welding of the plates, save current, and avoid any necessity for large supporting yokes in portable welding machines, no matter how great the areas of the welded plates may be.

The specific form of hand welding apparatus here shown is merely illustrative; any other suited to the conditions present may be substituted.

I claim:

1. In combination with two plates having edge flanges, the outer faces of said flanges being in contact, means supported on said plates for welding together said flange faces.

2. The combination of claim 1, further including as said welding means a yoke extending over said said flanges, and, supported by said yoke, electrodes receiving said flanges between them.

3. The combination of claim 1, further including as said welding means a yoke extending over said flanges, and, supported by said yoke, a fixed electrode and a movable electrode receiving said flanges between them.

In testimony whereof I have affixed my signature in presence of two witnesses

THOMAS E. MURRAY, JR.

Witnesses:
 GERTRUDE T. PORTER,
 MAY T. McGARRY.